United States Patent [19]

Delahanty

[11] Patent Number: 5,402,466
[45] Date of Patent: Mar. 28, 1995

[54] HOME VOICE MAIL AND PAGING SYSTEM USING AN ANSWERING MACHINE AND A WIDE VARIETY OF ALARMS

[75] Inventor: Thomas C. Delahanty, West Hills, Calif.

[73] Assignee: Dynamo Dresden, Inc., San Antonio, Tex.

[21] Appl. No.: 963,812

[22] Filed: Oct. 20, 1992

[51] Int. Cl.$^6$ .................... G08B 13/00; H04M 11/00
[52] U.S. Cl. ........................................ 379/44; 379/40; 379/42; 379/57; 379/68; 340/531; 340/539
[58] Field of Search ...................... 379/40–44, 379/47–51, 56, 57, 212, 68, 67, 88, 89; 340/531, 539

[56] References Cited

U.S. PATENT DOCUMENTS

| | | | |
|---|---|---|---|
| 4,065,642 | 12/1977 | McClure | 379/77 |
| 4,072,824 | 2/1978 | Phillips | 379/57 |
| 4,821,308 | 4/1989 | Hashimoto | 379/51 |
| 4,893,335 | 1/1990 | Fuller et al. | 379/57 |
| 4,942,598 | 7/1990 | Davis | 379/57 |
| 4,961,216 | 10/1990 | Baehr et al. | 379/57 |
| 4,985,916 | 1/1991 | Tachuk et al. | 379/178 |
| 5,081,667 | 1/1992 | Drori et al. | 379/44 |

*Primary Examiner*—John K. Peng
*Assistant Examiner*—Daniel J. Wu
*Attorney, Agent, or Firm*—Arnold B. Silverman; Kirk D. Houser

[57] ABSTRACT

Described is an automatic paging system that will alert a paging service subscriber to the occurrence of specific events at a remote location using a standard home type answering machine and/or a standard alarm system. The paging system works in conjunction with existing paging subscription services and answering machines presently available. The system detects if a valid message has been left on the answering machine or if an alarm has been tripped, then dials a number that the user programs into the system that corresponds to the paging service telephone number, then waits for an acknowledgment tone from the paging service and dials a distinct code that corresponds to what has occurred at the remote location. The system will forward a telephone number to the paging service subscriber, if such a number has been entered into the answering machine by a caller.

10 Claims, 4 Drawing Sheets

HOME VOICE MAIL AND PAGING SYSTEM USING AN ANSWERING MACHINE AND A WIDE VARIETY OF ALARMS

BACKGROUND OF THE INVENTION

1. Field of the Invention

The present invention relates generally to the field of remote operation of telecommunication and paging equipment. The present invention relates more specifically to a system for automatically paging and alerting a remote user to the presence messages left on an answering machine and/or the existence of alarm conditions that require the attention of the remote user.

2. Description of the Related Art

It is known in the field of telecommunications to provide electronic paging systems that are capable of informing a remote user of messages that have been left for the user on an answering machine at a different location. While there are many types of basic paging systems in use at the present time, one of the most common incorporates an LCD display on individual pocket sized pager units that is capable of informing the user that a caller to the pager number has left a telephone number to have their call returned. Usually this LCD display is long enough to display the entire phone number for the return call, or to display some other brief numerically coded message.

It is known to have an automatic means whereby the paging system subscriber can take advantage of not only the paging system's phone number (for those callers who might be aware of the subscriber's pager and pager number), but also of a standard home or office phone number that has answering machine capabilities (for those callers who might not be aware of the subscriber's pager and pager number). Automatic paging systems have been described that receive a phone call on a home or office phone line with an answering machine and inform the pager subscriber of the presence of a message left on the answering machine. Such systems, however tend to be complex and often beyond the budget of most individuals even though pagers and answering machines have become quite practical and common. The complexity and costs are such that if a paging system subscriber wishes such message forwarding abilities, it becomes more practical subscribe to cellular phone service.

In addition, the automatic paging systems that have thus far been described in the field are usually limited in their function to the transmittal of a seven digit phone number, or in some cases, just an indication that messages have been left for retrieval. It would be advantageous to broaden the capabilities of these systems to include the capacity to inform the user of other important conditions at the user's home or office.

While remote alarm systems in general are well known, they also tend to be sufficiently complex and expensive that their implementation in conjunction with a paging system becomes impractical. It would be advantageous if the same message notification system, capable of providing a return call telephone number, could also be triggered to page the user for other "alarm" type conditions. Furthermore, it would be advantageous to provide an electronic system that could provide these functions by working in conjunction with existing answering machine and paging systems, and would be of only moderate complexity and reduced cost.

SUMMARY OF THE INVENTION

It is therefore an object of the present invention to provide an electronic paging system that is capable of automatically paging a remote user in response to the reception of a message on the user's telephone answering machine.

It is a further object of the present invention to provide an electronic paging system that is capable of automatically paging a remote user in response to a variety of alarm conditions at the user's home or office.

It is a further object of the present invention to provide an electronic paging system that is capable of automatically paging a remote user in response to the reception of a message on the user's telephone answering machine, and communicating a phone number portion of the message to the remote user.

It is a further object of the present invention to provide an electronic paging system that is capable of automatically paging a remote user in response to a variety of alarm conditions, and communicating a coded message indicative of the type of alarm condition in existence.

It is a further object of the present invention to provide an electronic paging system that is capable of automatically paging a remote user in response to the reception of a message on the user's telephone answering machine, or in response to a variety of alarm conditions, that is of only moderate complexity and reduced cost.

It is a further object of the present invention to provide an electronic paging system, capable of automatically paging a remote user in response to a message on the user's telephone answering machine, or a variety of alarm conditions that will function in conjunction with existing home type answering machines and existing LCD display paging systems.

In fulfillment of these and other objects, the present invention provides an electronic circuit that is connected to both a standard phone line circuit and a standard telephone answering machine. When a call is made to the answering machine the phone line is seized and a prerecorded message is played. Typically the caller is invited to leave a message and possibly a phone number where a return call might reach them. The circuitry of the present invention will detect the seizing of the phone line by the answering machine and determine whether the caller has left a valid voice message and/or has dialed a telephone number into the system as they have been invited to do. When the initial call is terminated the circuitry will pause and then seize the phone line, dial a pager telephone number that the user has previously programmed into the system using a touch tone phone, detect an access tone from the paging system and then transmit (dial) either a code indicating that a voice message has been left ("2*" in the preferred embodiment) or the telephone number that the caller dialed into the answering machine. The circuitry then releases the seized phone line to detect another incoming call.

The paging system will transmit by way of radio waves to the appropriate pager, a signal that will be displayed on the pager's LCD display. Once the pager owner receives the page they will know to either call the answering machine to retrieve the message left or directly call the number that was left and retransmitted by the circuitry. The circuit will also "disarm" itself for one call cycle when it detects the user retrieving messages left on the answering machine by receiving at least two DTMF tones (typical of such remote retrieval systems) when the answering machine connects the call.

The circuitry of the present invention will also page the user in the same way as described above when one of a number of alarms have been tripped. The message left on the pager in this case will be a coded number that the user knows to associate with a particular alarm condition.

DETAILED DESCRIPTION OF THE PREFERRED EMBODIMENT

Figure 1A:
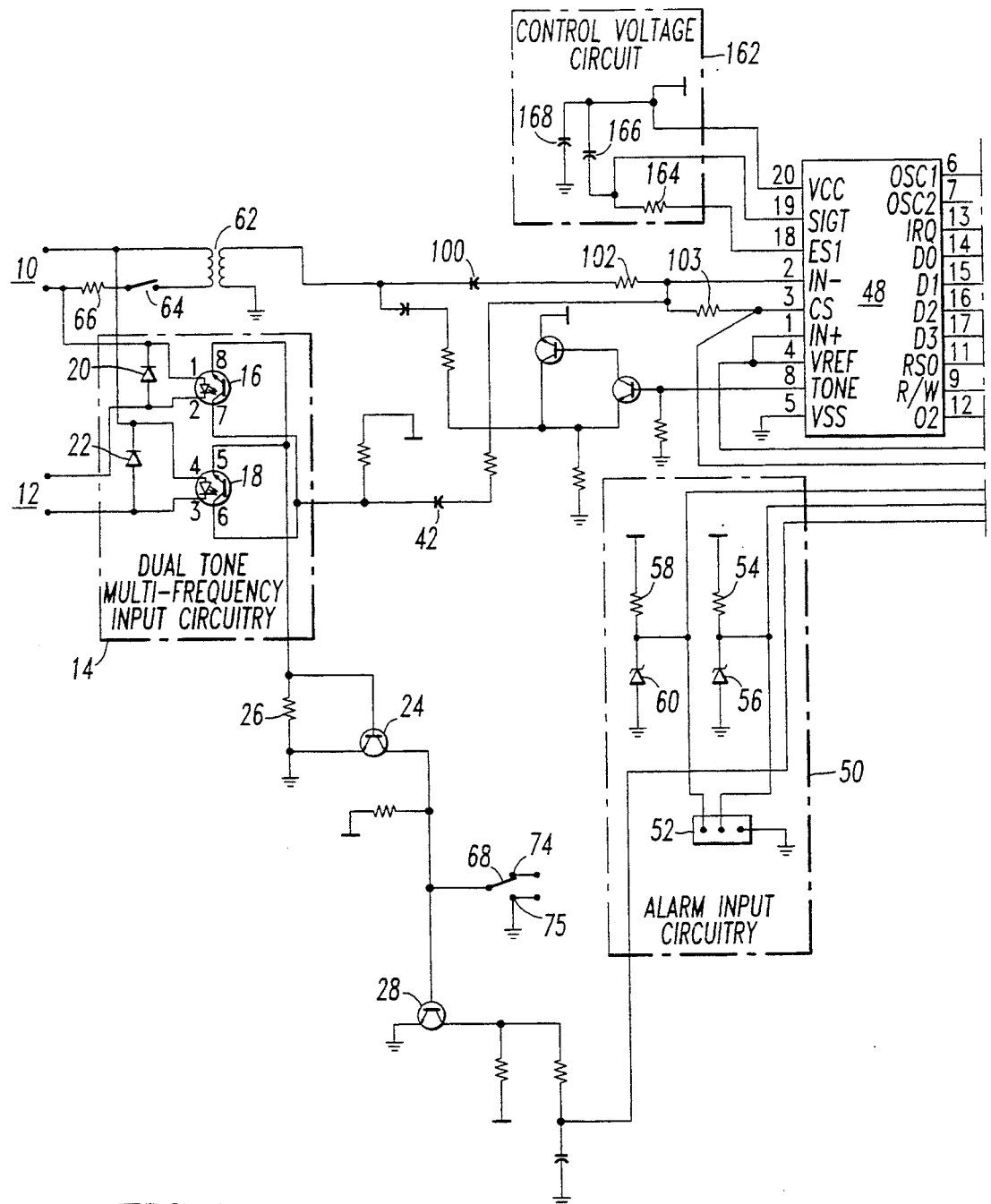
FIGS. 1a and 1b are an electronic schematic showing the complete circuitry for the implementation of the present invention.
Figure 1B:
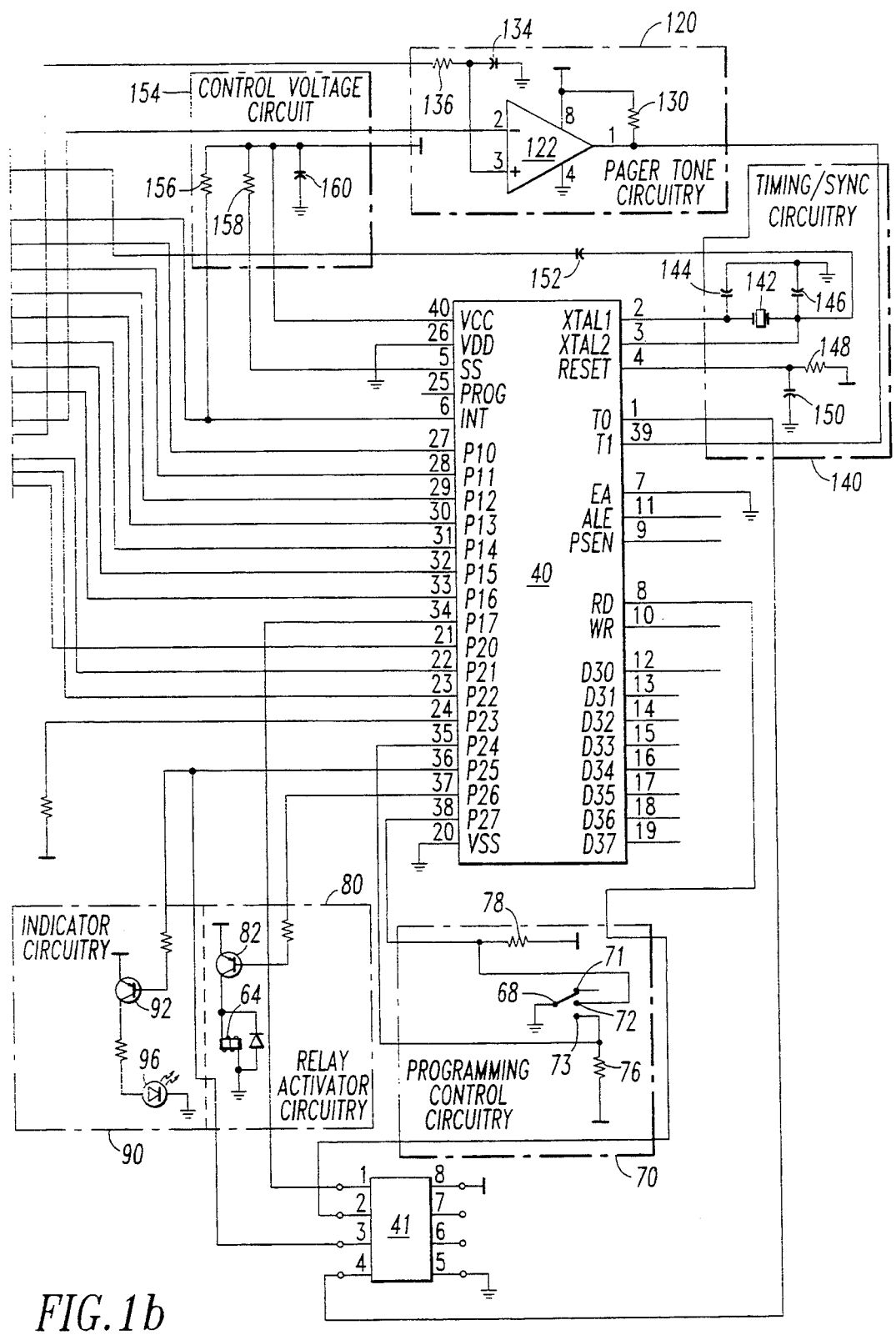

Reference is first made to FIG. 1a and 1b for a detailed description of the circuitry appropriate for implementation of the present invention. The circuitry is placed in series with a standard telephone answering machine, although pursuant to FCC regulations, it incorporates appropriate means for isolation from the telephone line and the pager circuitry, as will be described in more detail below.

The circuitry of the present invention is comprised generally of ringing and DTMF input circuitry (14), microcontroller IC (40), transceiver IC (48), alarm input circuitry (50), programming control circuitry (70), relay activator circuitry (80), indicator circuitry (90), pager tone circuitry (120), timing/sync circuitry (140), and the associated control voltage circuits (154 and 162).

Ringing and DTMF circuitry (14) for monitoring phone line (10) consists of dual optocoupler (16 and 18) (one unit) that is placed in series with answering machine (12) in the preferred embodiment, dual optocoupler (16 and 18) is a single MCT6 optocoupler. When answering machine (12) detects a predetermined number of ringing signal's from phone line (10) it will seize phone line (10) thereby conducting current through optocouplers (16 and 18) and lighting the LEDs located therein. Diodes (20 and 22), positioned parallel with the LEDs inside optocouplers (16 and 18), allow the AC ringing signal to pass and insure that the DC signal to optocouplers (16 and 18) is of the correct polarity regardless of phone line (10) polarity. This arrangement insures compliance with FCC rules regarding telephone line isolation.

Optocouplers (16 and 18) serve two purposes, first to signal microcontroller (40) when answering machine (12) is active, and second to pass DTMF (dual tone multi-frequency) signals to transceiver (48) as described in more detail below.

After the internal LEDs of optocouplers (16 and 18) have been lit the internal photo transistors in optocouplers (16 and 18) conduct and in turn send base voltage to transistor (24) to cause it to conduct. Resistor (26) holds transistor (24) nonconducting when optocouplers (16 and 18) are nonconducting. With transistor (24) conducting, the voltage to transistor (28) collapses and causes transistor (28) to go nonconducting. Transistors (24) and (28) are basic 2N2222 switching transistors in the preferred embodiment. Once transistor (28) is turned off, a logic high voltage is provided to microcontroller (40) port 2, bit 0. Microcontroller (40) programming will start timing how long answering machine (12) is off hook. Microcontroller (40) will then determine if answering machine (12) has been off hook long enough to consider the off hook condition a valid call, as will be described in more detail below. Microcontroller (40) is an 8048 IC in the preferred embodiment and is a programmable, multi-port controller with internal RAM. Microcontroller control voltage circuit (154), comprised of resistors (156 and 158) and capacitor (160), provides standard voltages and biasing for microcontroller (40).

Optocouplers (16 and 18) will also send DTMF signals, if any, through coupling capacitor (42) (1mf) which is connected to the input of an amplifier located in transceiver (48). Transceiver (48) will translate the incoming tones into binary coded decimal (BCD) that is sent to microcontroller (40) port 1, bits 0–3. Microcontroller (40) will then store these codes in EEPROM (41) for later use. Transceiver (48) in the preferred embodiment is an 8880 IC and is capable of both A/D conversion and D/A conversion. Transceiver control voltage circuit (162), comprised of resistor (164) and capacitors (166 and 168) provides standard voltage and biasing for transceiver (48). Transceiver (48) and microcontroller (40) are time synchronized by time/sync circuit (140), comprised of timing crystal (142), capacitors (144, 146, 150, and 152) and resistor (148). The values and arrangement of these components are according to practices well known in the art.

There are two separate alarm inputs associated with alarm input circuitry (50) of the present invention. The alarm inputs are normally closed to ground through alarm header (52). When the contacts in alarm header (52) are opened, as when the alarms are tripped, microcontroller (40) is activated. Alarm header (52) in its idle state will provide microcontroller (40) with a logic low condition at port 2, bits 1 and 2. Alarm header (52) is such that the alarm inputs are shorted to ground when no alarm units are plugged into it. When the ground connection is opened (alarm has been tripped) a logic high will be present at microcontroller (40) port 2, bit 1 or 2, that is provided by either resistor (54) or resistor (58). Zener diodes (56 and 60) act as blocking diodes in providing the logic signal. When a logic high has been detected at either one of microcontroller (40) port 2, bit 1 or 2, microcontroller (40) activates the alarm sequence described in more detail below. Coupling transformer (62), relay (64) and resistor (66) are connected to telephone line (10) for dialing out and for programming the dial out features of the present invention.

Figure 2A:
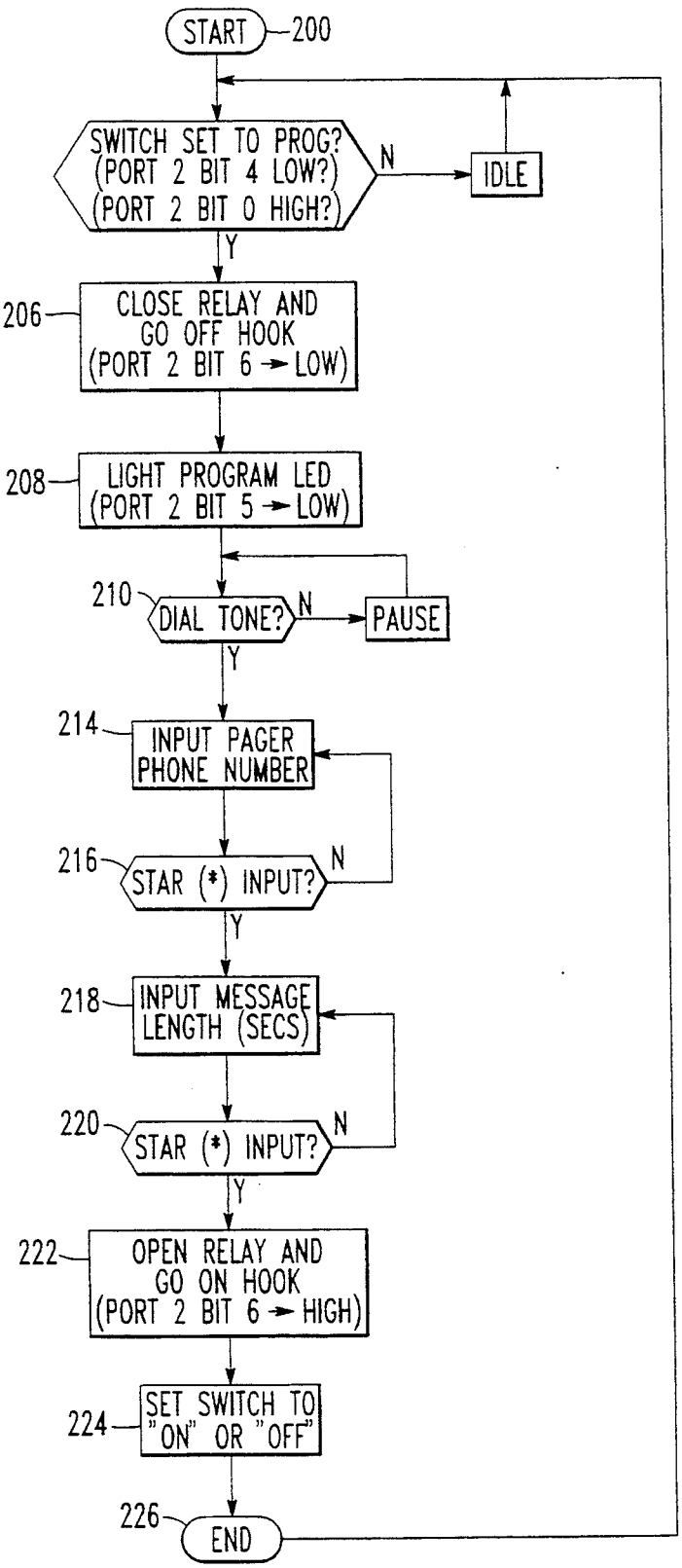
FIG. 2a is a general flow chart of the microcontroller sequence of steps appropriate for programming the circuitry of the present invention.

Reference is now made to FIGS. 1a–1b and 2a for a detailed description of the programming of the circuitry of the present invention. When the circuitry is to be programmed (step 200), control switch; (68) is moved to the program position (73 and 75), thereby providing a logic low to port 2, bit 4 of microcontroller (40) (normally held high through resistor (76)), and also providing a logic low to the base of transistor (28) which provides a logic high to microcontroller (40) port 2, bit 0 (step 202). This instructs microcontroller (40) to provide a logic low to port 2, bit-6, which causes transistor (82) (a 2N2907 transistor in the preferred embodiment) to conduct which sends current to relay (64) and closes it (step 206). Microcontroller (40) also provides a logic low to port 2, bit 5 which causes transistor (92) (also a 2N2907 transistor) to conduct. With transistor (92) conducting, current is sent to LED (96), thereby illuminating it and informing the programmer that the unit is in the program mode (step 208). With relay (64) closed, telephone line (10) is loaded and an off hook condition is sent to the phone company. The phone company in response sends a dial tone (step 210) through phone line (10).

After the off hook and dial tone connection is made at phone line (10) as a result of manually throwing switch (68) the pager telephone number can be programmed into the unit (step 214). This is accomplished by using a touch tone phone and dialing the pager phone number. The phone number is sent as a DTMF signal through resistor (66) which limits the load of phone line (10), then through relay (64), and then to the primary side of coupling transformer (62). The secondary side of transformer (62) in turn sends the DTMF signals to the input amplifier of transceiver (48). Transceiver (48) converts the DTMF signal to BCD which in turn is sent to port 1, bits 0–3 of microcontroller (40), where the number is then stored in EEPROM (41).

The programmer then dials the star "*" key (step 216) on the touch tone phone unit which signal is also sent to transceiver (48) and on to microcontroller (40) to instruct microcontroller (40) to step the program to the next function.

The next function (step 218) is to store the length of time in seconds of the greeting prerecorded in answering machine (12). This time value is entered into the touch tone phone as a numerical value and is stored in the same manner as described with the pager number above.

The programmer then dials another star "*" (step 220) to indicate to microcontroller (40) that the programming is complete. Once the programming is complete the programmer goes on hook (step 222) and returns control switch (68) from the program position (73 and 75) to the on (71 and 74) or off (72 and 74) position (step 224). This in turn sends a logic high back to transistor (28) and causes it to conduct which in turn sends a logic low to microcontroller (40) port 2, bit 0. By putting switch (68) into the off (72) position, a logic low is provided to microcontroller (40) port 2, bit 7, normally held high through resistor (78), which instructs microcontroller (40) to activate alarm input circuitry (50) (i.e. detect logic signals at port 2, bits 1 and 2) and deactivate ringing and DTMF input circuitry (14) (i.e. ignore logic state of port 2, bit 0). By putting switch (68) into the on (71) position a logic high is provided to microcontroller (40) port 2, bit 7, through resistor (78), that instructs microcontroller (40) to activate both alarm input circuitry (50) and ringing and DTMF input circuitry (14). This completes the user programming steps for the circuitry (step 226).

Figure 2B:
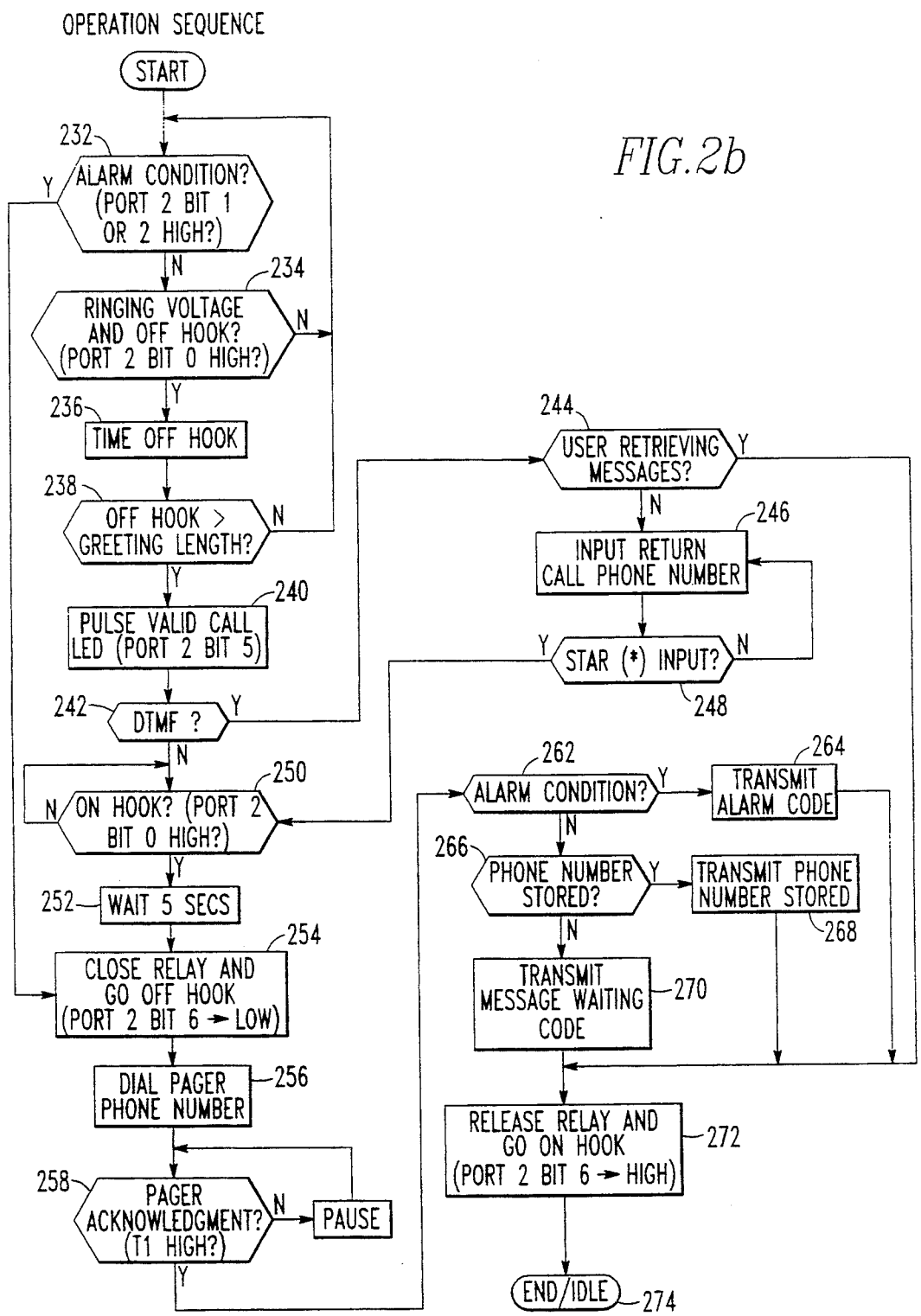
FIG. 2b is a general flow chart of the microcontroller sequence of steps appropriate for the operational function of the circuitry of the present invention.

The typical sequence of events in the functioning of the circuit of the present invention is described with reference to FIGS. 1a–1b and 2b, and is as follows: A ringing voltage is presented at phone line (10) and answering machine (12) seizes phone line (10). This sends a logic high as described above to port 2, bit 0 of microcontroller (40) (step 234). Microcontroller (40) starts timing the off hook time (step 236). If the time is longer than the greeting length (step 238) on answering machine (12), per the earlier programming, microcontroller (40) recognizes that this is a valid call (step 240) and sends a pulsed logic high to transistor (92) which in turn pulses LED (96). LED (96) will blink on and off at an interval of about one pulse per second.

Once microcontroller (40) has detected a valid call it waits for answering machine (12) to hang up, which detected as a logic low to microcontroller (40) port 2, bit 0 as described above (step 250). After port 2, bit 0 goes low microcontroller (40) waits five seconds (step 252) and then sends a logic high to transistor (82) which in turn trips relay (64) (step 254). Diode (86) insures proper current flow through relay (64). Once relay (64) is conducting the connection to phone line (10) is complete. Microcontroller (40) then waits two seconds for dial tone (from phone company) to be established and then transmits the programmed pager number (step 256), stored earlier, in BCD form to transceiver (48) which in turn converts this BCD code into DTMF signals. The DTMF signals are then 'sent to the secondary side of transformer (62) and thus to the primary of transformer (62) where they are detected on phone line (10). Once the preprogrammed pager number has been dialed, microcontroller (40) waits for the acknowledgement signal from the external pager network (step 258). This signal tone (usually around 1400 hz) is sent by the paging terminal to acknowledge that a valid connection has been made. If no signal tone is received the circuitry will disconnect and recycle the call to the external pager network up to three times before cancelling the effort.

The circuitry of the present invention detects this pager acknowledgement tone as follows: The tone is sent through phone line (10) through transformer (62) then through capacitor/resistor series (100 and 102) to the input amplifier of transceiver (48). Resistor (103) is between the input and the GS terminal of transceiver (48). From the output of this amplifier, an analog signal is sent to the input of comparator (122) in pager tone signal conditioner circuit (120). Resistors (130 and 136) and capacitor (134) in circuit (120) provide standard biasing to comparator (122) according to practices well known in the field. Comparator (122) converts the pager tone from an analog signal to a digital square wave. This square wave is sent from the output of comparator (122) to the T1 input of microcontroller (40). Microcontroller (40) recognizes this 1400 hz digital waveform and transmits the appropriate code or number in response (steps 262/264, 266/268, and 270).

If a message was left on answering machine (12), but no phone number was left with the message (step 266), microcontroller (40) transmits a "2" and a "*" through transceiver (48) as described previously (step 270). Once the correct code has been sent, microcontroller (40) sends a logic high to port 2, bit 6 (step 272) which turns off transistor (82) which in turn opens relay (64) which releases phone line (10) (step 274).

A similar sequence of events takes place with the activation of one or both of the alarms. Microcontroller (40) will dial the pager number and transmits a code in response to the pager tone. Once an alarm has been tripped either microcontroller (40) port 2, bit 1 or port 2, bit 2 goes to a logic high as explained earlier and activates the calling sequence (step 232). Phone line (10) is seized (step 254), microcontroller (40) dials the preprogrammed pager number (step 256), waits for the acknowledgment tone (step 258) and then transmits a "3" and a "*" or a "4" and a "*" depending on which alarm has been tripped (step 262/264). In the preferred embodiment the first alarm is the "3*" and the second alarm is the "4*".

The circuitry is also capable of detecting when an incoming call is the user checking messages on answering machine (12). When answering machine (12) seizes telephone line (10) (step 234), transceiver (48) will immediately detect DTMF tones (step 242) through optocouplers (16 and 18). If DTMF signals are detected, transceiver (48) will convert them as before and send them to microcontroller (40). If microcontroller (40) detects at least two of these codes it will recognize the owner calling in for messages (step 244). These tones can be the message access code for answering machine (12) or any DTMF tones. If indeed there are two tones detected the subsequent paging sequence will be disabled (step 272) for this call and this call only. This feature allows the owner to retrieve messages without being paged once the retrieval process is complete. The circuitry will return to normal operation (step 274) after answering machine (12) releases seized phone line (10).

The user may instruct callers in its answer machine message to leave their phone number by entering the number on their touch tone phone into the answer machine system (step 246). The caller can dial the phone number where they can be reached (at least 7 digits) followed by the "*" key (step 248). The star key instructs microcontroller (40) to store the preceding numbers. These tones are received through optocouplers (16 and 18), converted by transceiver (48) and stored in EEPROM (41) by microcontroller (40) in the same manner as the off hook programming of the pager number described above.

After the call terminates the call and answering machine (12) releases seized phone line (10) (step 250) the circuitry goes through the pager dialing sequence (steps 252-256) described above, and after it receives the pager acknowledgment tone (step 258), transmits the number that the caller left (steps 266/268). This number will be displayed on the pager's display just as the codes are displayed.

While a number of functions of the preferred embodiment of the present invention have been described, it is anticipated that one skilled in the art would identify further functions and embodiments of the apparatus and methods described that would be consistent with the disclosure and the appended claims.

I claim:

1. An automatic paging system for operation in conjunction with a telephone answering machine, a standard telephone line circuit, and a paging service, said automatic paging system comprising:
   means for recognizing and receiving a standard ringing voltage and standard dual tone multi-frequency signals;
   means for decoding said dual tone multi-frequency signals into binary coded decimal and outputting said binary coded decimal, and means for encoding said binary coded decimal into said dual tone multi-frequency signals and transmitting said dual tone multi-frequency signals to said telephone line circuit;
   means for receiving and storing said binary coded decimal from said means for decoding said dual tone multi-frequency signals into binary coded decimal, and means for transmitting said binary coded decimal to said means for encoding said binary coded decimal, and means for receiving and detecting indications of an open and a closed condition of a plurality of alarm inputs, and means for detecting an off hook condition in said telephone line circuit and for determining when a valid message has been left on said answering machine, and means for effecting an off hook condition in said telephone line circuit;
   means for transmitting one of a plurality of codes from said means for receiving and detecting indications of said condition of said plurality of alarm inputs to said means for transmitting said binary coded decimal, with each code of said plurality of codes being representative of a condition of a corresponding one of said plurality of alarm inputs;
   means for programming said means for receiving and storing said binary coded decimal with a telephone number for a remote receiver in said paging service; and
   means for recognizing and receiving a connection acknowledgement signal from said paging service.

2. The automatic paging system of claim 1 wherein said means for recognizing and receiving a standard ringing voltage and standard dual tone multi-frequency signals comprises a dual optocoupler connected to said telephone answering machine and to said telephone line circuit, said optocoupler receiving said ringing voltage and transmitting a logic signal to said means for detecting an off hook condition in said telephone line circuit, said optocoupler further receiving said dual tone multi-frequency signals and transmitting said dual tone multi-frequency signals to said means for decoding said dual tone multi-frequency signals.

3. The automatic paging system of claim 2 wherein said means for decoding said dual tone multi-frequency signals and encoding said binary coded decimal into said dual tone multi-frequency signals, comprises a transceiver circuit, said transceiver circuit receiving said dual tone multi-frequency signals from said optocoupler and transmitting said binary coded decimal to said means for receiving and storing said binary coded decimal, said transceiver further receiving binary coded decimal from said means for transmitting said binary coded decimal, and transmitting said dual tone multi-frequency signals to said telephone line circuit.

4. The automatic paging system of claim 3 wherein said means for receiving and storing said binary coded decimal, and said means for transmitting said binary coded decimal and said means for receiving and detecting indications of an open and a closed condition of said a plurality of alarm inputs, and said means for detecting said off hook condition and for determining said valid message, and said means for effecting said off hook condition, collectively comprise a microcontroller circuit, said microcontroller circuit receiving and storing a multi-bit binary coded decimal number indicative of a telephone number of said paging service, and a multi-bit binary coded decimal number indicative of a telephone number left by a caller to said answering machine, said microcontroller also retransmitting said binary coded decimal numbers through said transceiver, said microcontroller also carrying out a preprogrammed sequence of steps in response to an off hook condition in said telephone line circuit, said valid message, said condition of said alarm inputs, and said connection acknowledgement signal from said paging service.

5. The automatic paging system of claim 4 further comprising means for converting said connection acknowledgement signal from said paging service to a logic signal recognizable to said microcontroller.

6. The automatic paging system of claim 1 wherein said means for programming comprises a means for manually effecting said off hook condition in said telephone line circuit and inputting a telephone number of said paging service into said means for receiving said dual tone multi-frequency signals, said telephone number thereby being stored in binary coded decimal form in said means for storing said binary coded decimal.

7. A method for the automatic paging of a paging service subscriber in response to alarm conditions at a remote location, said method comprising the steps of:
recognizing and receiving an indication of a plurality of said alarm conditions;
effecting an off hook condition in a standard telephone line circuit;
encoding a stored binary coded decimal number, indicative of a telephone number for said paging service, into a first dual tone multi-frequency signal and transmitting said first dual tone multi-frequency signal to said paging service;
detecting a connection acknowledgement signal from said paging service;
encoding a stored binary coded decimal number into a second dual tone multi-frequency signal and transmitting said second dual tone multi-frequency signal to said paging service, with said stored binary coded decimal number as encoded into said second dual tone multi-frequency signal being recognizable to said paging service subscriber as being representative of a condition of a corresponding one of said plurality of said alarm conditions; and
effecting an on hook condition in said telephone line circuit.

8. An automatic paging system for operation in conjunction with a telephone answering machine and a standard telephone line circuit for connection to a paging service, said automatic paging system comprising:
a ringing and dual tone multi-frequency input circuit, said input circuit recognizing and receiving a standard ringing voltage and standard dual tone multi-frequency signals;
a transceiver circuit decoding said dual tone multi-frequency signals into binary coded decimal and transmitting said binary coded decimal, and encoding said binary coded decimal into said dual tone multi-frequency signals and transmitting said dual tone multi-frequency signals to said telephone line circuit;
a microcontroller circuit receiving and storing said binary coded decimal from said transceiver and transmitting said binary coded decimal to said transceiver, said microcontroller also detecting an open and a closed condition of a plurality of alarm inputs and transmitting one of a plurality of codes to said transceiver, with each code of said plurality of codes being representative of a condition of a corresponding one of said plurality of alarm inputs, said microcontroller also detecting an off hook condition in said telephone line circuit and effecting an off hook condition in said telephone line circuit, said microcontroller also detecting that a valid message is present on said answering machine and transmitting a unique microcontroller specified code representative of said valid message to said transceiver; and
a programming circuit instructing said microcontroller to receive a binary coded decimal number signal from said transceiver, said binary coded decimal number being indicative of a telephone number for a remote receiver in said paging service.

9. An automatic paging system for operation in conjunction with a telephone answering machine and a standard telephone line circuit for connection to a paging service, said automatic paging system comprising:
a ringing and dual tone multi-frequency input circuit, said input circuit recognizing and receiving a standard ringing voltage and standard dual tone multi-frequency signals;
a transceiver circuit decoding said dual tone multi-frequency signals into binary coded decimal and transmitting said binary coded decimal, and encoding said binary coded decimal into said dual tone multi-frequency signals and transmitting said dual tone multi-frequency signals to said telephone line circuit;
a microcontroller circuit receiving and storing said binary coded decimal from said transceiver and transmitting said binary coded decimal to said transceiver, said microcontroller also detecting an off hook condition in said telephone line circuit and effecting an off hook condition in said telephone line circuit, said microcontroller also detecting an open and a closed condition of a plurality of alarm inputs, said microcontroller also detecting that a valid message is present on said answering machine, said microcontroller also transmitting at least one of: one of a plurality of codes, with each code of said plurality of codes being representative of a condition of a corresponding one of said plurality of alarm inputs, and a unique microcontroller specified code representative of said valid message, to said transceiver; and
a programming circuit instructing said microcontroller to receive a binary coded decimal number signal from said transceiver, said binary coded decimal number being indicative of a telephone number for a remote receiver in said paging service.

10. The automatic paging system as recited in claim 9 wherein said microcontroller transmits said one of said plurality of codes to said transceiver, and in response to said valid message, said microcontroller effects an off hook condition in said telephone line circuit without transmitting a unique microcontroller specified code representative of said valid message to said transceiver.

* * * * *

UNITED STATES PATENT AND TRADEMARK OFFICE
CERTIFICATE OF CORRECTION

PATENT NO. : 5,402,466
DATED : March 28, 1995
INVENTOR(S) : Delahanty, Thomas C.

It is certified that error appears in the above-identified patent and that said Letters Patent is hereby corrected as shown below:

Column 9,
Line 20, change "said paging service" to -- said standard telephone line circuit --

Signed and Sealed this

Eighth Day of April, 2003

JAMES E. ROGAN
*Director of the United States Patent and Trademark Office*